US011890893B2

(12) United States Patent
Ross et al.

(10) Patent No.: US 11,890,893 B2
(45) Date of Patent: *Feb. 6, 2024

(54) DIGITAL PRINTED HEAT TRANSFER GRAPHICS FOR SOFT GOODS

(71) Applicant: Lion Brothers Company, Inc., Owings Mills, MD (US)

(72) Inventors: Gillian Ross, Ellicott City, MD (US); Owen McGovern, Columbia, MD (US); Paul Weedlun, Fulton, MD (US); Stephen Mynott, Towson, MD (US)

(73) Assignee: Lion Brothers Company, Inc., Owings Mills, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/487,638

(22) Filed: Sep. 28, 2021

(65) Prior Publication Data

US 2022/0097444 A1 Mar. 31, 2022

Related U.S. Application Data

(63) Continuation of application No. 17/287,795, filed as application No. PCT/US2019/057423 on Oct. 22, 2019, and a continuation of application No. 16/166,457, filed on Oct. 22, 2018, now Pat. No. 11,130,364, application No. 17/487,638 is a continuation of application No. 16/166,457, filed on Oct. 22, 2018, now Pat. No. 11,130,364.

(60) Provisional application No. 62/574,791, filed on Oct. 20, 2017.

(51) Int. Cl.

| | |
|---|---|
| ***B44C 1/17*** | (2006.01) |
| ***B41M 3/12*** | (2006.01) |
| ***B41M 5/00*** | (2006.01) |
| ***B41M 5/025*** | (2006.01) |
| *B41M 5/52* | (2006.01) |
| *B41M 7/00* | (2006.01) |

(52) U.S. Cl.

CPC ............... *B44C 1/172* (2013.01); *B41M 3/12* (2013.01); *B41M 5/0052* (2013.01); *B41M 5/0256* (2013.01); *B44C 1/1712* (2013.01); *B41M 5/5254* (2013.01); *B41M 5/5281* (2013.01); *B41M 7/0081* (2013.01)

(58) Field of Classification Search

None

See application file for complete search history.

(56) References Cited

U.S. PATENT DOCUMENTS

2001/0025687 A1* 10/2001 Cross .................... B44C 1/1712 156/254
2007/0172610 A1* 7/2007 Williams ................. D06Q 1/00 428/32.51

(Continued)

*Primary Examiner* — Joel G Horning

(74) *Attorney, Agent, or Firm* — Royal W. Craig; Gordon Feinblatt LLC

(57) ABSTRACT

A thermal transfer and process for producing it that provides a fully-digital printed heat transfer capable of little to no process changeover between different graphics. Specifically, the method comprises printing a digital image onto a treated adhesive substrate, applying the image side to a carrier substrate, then digitally cutting and removing substrate not containing graphic elements photographic quality, durable print transfers for the apparel and soft goods industry.

18 Claims, 2 Drawing Sheets

(56) References Cited

U.S. PATENT DOCUMENTS

| | | | | |
|---|---|---|---|---|
| 2009/0105071 | A1* | 4/2009 | Principe | B41M 5/38207 503/227 |
| 2009/0176039 | A1* | 7/2009 | af Strom | B41M 3/12 428/32.77 |
| 2015/0122410 | A1* | 5/2015 | Tanrikulu | B41M 5/38242 428/32.52 |

* cited by examiner

DIGITAL PRINTED HEAT TRANSFER GRAPHICS FOR SOFT GOODS

CROSS-REFERENCE TO RELATED APPLICATION(S)

This application is a continuation of U.S. Ser. No. 16/166,457 filed 22 Oct. 2018 (now U.S. Pat. No. 11,130,364), which derived priority from provisional application No. 62/574,791 filed 20 Oct. 2017, and is a continuation of U.S. Ser. No. 17/287,795 which is National Stage Entry of PCT/US19/57423 filed 22 Oct. 2019, which likewise derived priority from provisional application 62/574,791 filed 20 Oct. 2017.

BACKGROUND OF INVENTION

1. Field of the Invention

The present invention relates to heat activated transfers and, particularly, to a fully digital inkjet or laser primed heat-transfer comprised of numbers, letters, logos, graphics, and other indicia.

2. Description of the Background

Toner and ink-printed heat transfers are well-known and commonly used to transfer a graphic, such as text or a figure, onto an item, such as apparel or merchandise. A transfer sheet or release sheet is usually pre-printed with a graphic, and then the graphic is transferred from the transfer sheet or release sheet to the item using a heated platen, iron or the like.

It is typical to apply a release layer to the transfer sheet before the graphic is printed, then print the toner/ink graphic atop the release layer, and then coat the adhesive over the top surface of the graphic. When a user then applies the graphic to the item, the graphic transfer is turned adhesive-side down onto the item and heat is applied to the release sheet to transfer the graphic to the item from the release layer of the release sheet.

Inks and toners can be digitally printed by a variety of methods including static discharge or ink jet printing. Thus, printing techniques such as gravure printing, offset printing, flexographic printing, screen printing and digital printing all can be used to create a heat transfer. The adhesive must be capable of being thermally activated and heat sealable in order for the user to transfer the graphic from the transfer substrate to the item. The adhesive application is usually not a continuous layer. Rather, when creating a diverse selection of products, the shape and distribution of the adhesive layer is usually specific to each product type. Consequently, the adhesive is usually applied to the toner/ink post-printing, using a separate screening process, e.g., a stencil method of application in which blank areas are "screened" such that glue is only transferred onto the inked areas. Therefor a template is required to expose an area specific to each product. This requires an off-line manufacturing process to create a screen for selectively applying the adhesive, e.g. U.S. Pat. No. 6,423,406 to Bilodeau et al issued Jul. 23, 2002. Moreover, the adhesive application adds a time-consuming, non-digital step separate from the printing step. The interruption of the digital process significantly contributes to the fixed cost of downtime and changeovers between graphic changes, e.g., any change in shape between designs and lowering the productivity of the operation by increasing change-over time. However, the apparel industry increasingly demands quick-change low-inventory production of custom articles in small batches with low turnaround time while keeping inventory at a minimum.

Additionally, the off-line screen manufacturing process is highly reliant on environmentally damaging chemicals. Increasingly, customers and brands are seeing value in reducing the environmental impact of their products.

What is needed is a more efficient method than screen-applying adhesive. Until now heat transfer manufacturers have been unable to provide a fully digital heat transfer, and therefore they impose large minimum-order requirements and/or request a set up charge for small order quantities, both of which are undesirable for the customer.

Efforts to date to improve the process offer only partial solutions. For example, one alternative method of producing digitally printed heat transfers by inkjet or laser printing onto white or clear vinyl film that already has an adhesive coating applied. The film is then knife-cut to remove unwanted portions of the vinyl media. Generally, products that are produced in this way are stiff and heavy and have relatively slow production speeds when compared with high-speed laser or inkjet printing. In addition, such products use environmentally damaging, materials in their manufacturing processes such as PVC and solvents.

Yet another method of producing digitally printed heat transfers entails laser-printing a toner printable sheet, pressing an adhesive coated paper to the print such that the adhesive only sticks in the digitally printed areas, and then use those layers in conjunction with an opaque layer as the final transfer decoration. This approach is described in U.S. Pat. No. 8,236,122 to Kronzer issued 7 Aug. 2012. Unfortunately, the laminating conditions used in this process have very small tolerances that are difficult to achieve on a regular basis. Additionally, the processing time to adhere the adhesive to the print is substantial, on the order of thirty seconds per sheet, which cannot compare to the speed of production of a high speed laser or inkjet printing. What is needed is a method for applying adhesive in a full-digital printing process.

SUMMARY OF THE INVENTION

It is, therefore, an object of the present invention to provide a fully-digital-printed heat transfer graphic and method of manufacture, to meet the needs of the market for smaller order quantities and even customized heat transfers without compromise in product quality, all whilst being produced in a more environmentally friendly way.

According to the present invention, the above-described and other objects are accomplished by providing a more efficient process for producing a fully-digitally printed heat transfer capable of little to no process change-over between different graphics, as well as the fully-digitally-printed heat transfer provided thereby. Specifically, the method comprises printing a digital image onto an adhesive substrate, applying the image side to a carrier substrate, then digitally cutting and removing substrate not containing graphic elements to produce a high stretch, multi-color photographic quality print transfer for the apparel and soft goods industry. More particularly, the method entails laser printing or inkjet printing onto the adhesive, laser cutting the adhesive/substrate in register with the print and "weeding" the unprinted adhesive areas and or cutting through internal unprinted areas. Weeding involves removing the adhesive from the non-printed areas.

A variation of the method is to print using a laser printer onto a transfer paper, transfer the graphic from the paper directly to an adhesive film, laser cutting the adhesive in register with the print and weeding the unprinted adhesive areas or cutting through internal unprinted areas.

In either case the method replaces the conventional multi-step process, using a sheet or roll-fed process.

Claimed are some forms of the heat transfer products as described in the drawings below as generated through either of these methods.

BRIEF DESCRIPTION OF THE DRAWINGS

Other objects, features, and advantages of the present invention will become more apparent from the following detailed description of the preferred embodiment and certain modifications thereof, in which.

DETAILED DESCRIPTION OF THE PREFERRED EMBODIMENT

Generally, a more efficient fully-digitally-printed heat transfer graphic and method of manufacture is disclosed that results in graphical sophistication and resolution with little or no process changeover between different graphics. The method disclosed herein replaces the conventional multistep process. Specifically, the present method comprises printing a digital image onto a sheet or roll-fed treated adhesive substrate. After printing, the process entails digitally cutting and removing substrate not containing graphic elements to produce a durable, high stretch, multi-color photographic quality print transfer for the apparel and soft goods industry.

Figure 1:
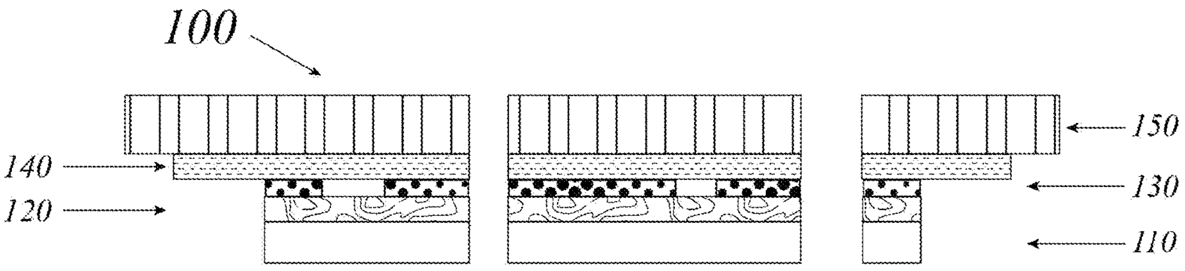
FIG. 1 is a cross sectional showing a completed digitally printed heat transfer 100.

Referring initially to the drawings, FIG. 1 illustrates a digitally printed heat transfer 100. The heat transfer 100 generally is formed on a thermo-plastic adhesive layer 110, the adhesive layer 110 being coated with a toner/ink receptive layer 120, and imprinted with one or more digitally-printed images 130 configured to define one or more graphics and/or text. In addition, a protective layer 140 comprising a polymeric coating overlies the printed images 130, and a carrier paper 150 is adhered to the protective layer 140 for handling and transportation purposes.

As an alternative to adhering carrier paper 150 to the protective layer 140, the carrier paper 150 and protective layer 140 may be heat applied to the toner/ink layer 130 simultaneously using, for example, Coveme's KTR Digital Matte or Arjowiggins D110 and Digipeel transfer media products.

Adhesive layer 110 is a suitable polymeric thereto-plastic film upon which the remaining layers of the heat transfer 100 are supported and transferred and adhered to the soft goods. One skilled in the art will understand that there are different types of adhesive films which can be applied to fabrics, and suitable polyester, polyamide and polyolefin films are known in the art. However, most adhesives commonly used in the industry are not suitable for the methods described herein because the process requires that the adhesive layer 110 remain solid at temperatures exceeding 90 C that are typical for digital printing. Thus, the adhesive layer 110 of the present invention preferably has a melt point on the printable side of at least 110 C and most preferably greater than 120 C. The printed side of the adhesive will soften during application to allow for texturing, patterning and determination of gloss level of the product by use of specially designed finishing papers. This also allows for the product to take on the texture of the garment if desired. The adhesive may contain fillers to increase opacity of the transfer. This is especially important when applying to patterned garments. The opacity of the adhesive may be improved by incorporating fillers such as $TiO_2$, for improved whiteness, or carbon black for improved blocking of the garment pattern. In an alternate embodiment the adhesive layer 110 is multi-layered so that the adhesive layer being printed melts at a higher temperature than a secondary layer of adhesive. In this embodiment both layers can contribute to adhesion, but successful adhesion can be achieved with a lower heat seal temperature. This allows the adhesive layer that is the opposite side to the print to have a melt point below 110 C for application to heat sensitive substrates. The thermoplastic adhesive layer 110, may also require a support with release layer, to successfully navigate the printing process. This support with release layer will be removed after the carrier layer 150 is applied.

In use the heat transfer 100 is applied to the front side or the back side of a clothing article, or even on a tag of the clothing article depending on the wants and/or needs of the manufacturer or user and the adhesive layer 110 creates a permanent bond herewith. To take on the texturing of the garment a second press is necessary after removing the carrier layer 150. Air entrapped between a heated platen and the heat transfer 100 will be under high pressure and press the adhesive layers around the garment fibers. The resulting texture of the heat transfer surface then matches the garment underneath.

Toner/ink receptive treatment 120 is a suitable adhesion promotor. For example, chlorinated polyolefins (CPOs) are widely used as adhesion promoters for coatings, toners, and inks on polyolefin plastic, and Eastman Kodak® produces a line of suitable products. Additionally, Michelman Inc. produces a primer coating consisting of a combination of a copolymer of ethylene and acrylic or methacrylic acid and a compatible adhesion promoter including an aliphatic polyurethane dispersion, a hydrogenated hydrocarbon rosin or rosin ester dispersion, and an amorphous acrylic polymer dispersion (detailed in US Patent application 20050245651). With regards to liquid toner printing it is especially important that the toner receptive treatment 120 enables durable adhesion between the substrate and the toner. Furthermore, the substrate can be designed to be toner/ink receptive without additional coating.

Toner/ink layer 130 may be any suitable toner/ink deposited by any suitable digital print head. A variety of suitable toner inks can be used for digitally printing the graphic image 130 as is known in the art, as long as the toners/inks provide visually recognizable information and durability against adverse conditions. In an embodiment, the toner/ink layer is dry toner printed with a digital laser printer, such as a Xeikon™ laser printer, or a digital offset press such as Indigo® available from HP of Palo Alto, Calif.

Protective layer 140 is an outermost polymeric layer for the heat transfer 100 on the clothing article or apparel that serves to protect the printed images 130 from damage.

The combined protective layer 140 and/or printed image 130 should be capable of achieving a desired degree of flexibility and extensibility for the particular decorating (i.e., labeling) application. More particularly, at least a portion of the protective layer 140 and/or printed image 130 ideally elastically stretches (i.e., extends or elongates) at least about 5%, and more preferably from about 5% to about 75% in at least one direction, without substantially cracking, speckling, distorting, or forming any other substantial defect in the heat transfer graphic 100 when the graphic is applied to the clothing article or soft good. After application the product is durable, and can go through multiple laundry cycles of hot wash and warm dry without substantially cracking, speckling, or forming any other substantial defect.

If desired, the protective layer 140 and/or printed image 130 may be formed from a curable composition or system, for example, an energy curable composition or system, such as printing the image with toner to provide a transfer graphic 100 that includes optically readable information, has excellent durability against wind, rain, and light, and can be produced more simply and at low cost.

Carrier paper 150 may be any suitable release-coated paper or film to protect and maintain the adhesive properties of the transfer 100 prior to application to the target product. The carrier paper 150 is simply peeled away and discarded after application of the transfer to the target product.

Figure 2:
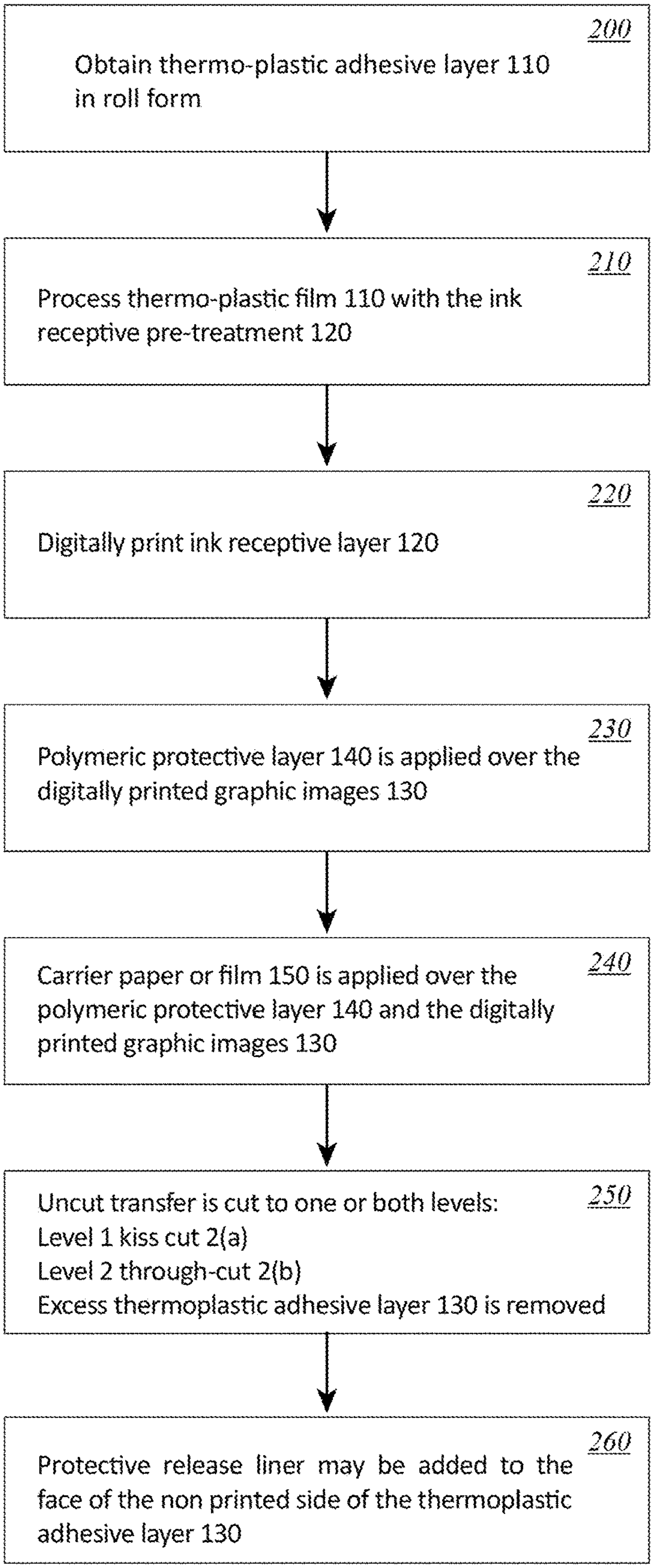
FIG. 2 is a block diagram of the sequential method of manufacturing the digitally printed heat transfer of FIG. 1.

FIG. 2 is a block diagram illustrating a method of manufacturing the digitally printed heat transfer label 100.

At step 200 the thermo-plastic adhesive layer 110 is obtained in roll form.

At step 210 the adhesive layer 110 is processed with the toner/ink receptive pre-treatment 120. For example, see WO2016196267 which is polyurethane base with self-cross-linking acrylic emulsion.

At step 220 the toner/ink receptive treatment 120 is digitally printed to create one or more digitally-printed images 130 configured to define one or more graphics end or text.

Figure 3:
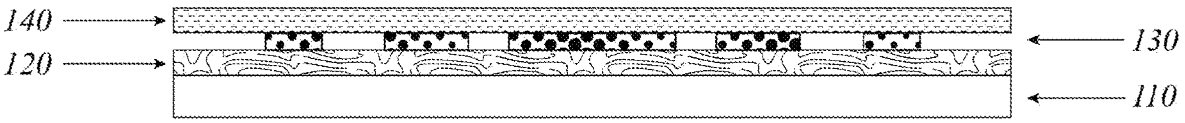
FIG. 3 is a cross sectional view of the digitally printed graphic images 130 to yield an intermediate transfer.

At step 230 polymeric protective layer 140 is applied over the digitally printed graphic images 130 to yield an intermediate transfer, as seen in FIG. 3.

Figure 4:
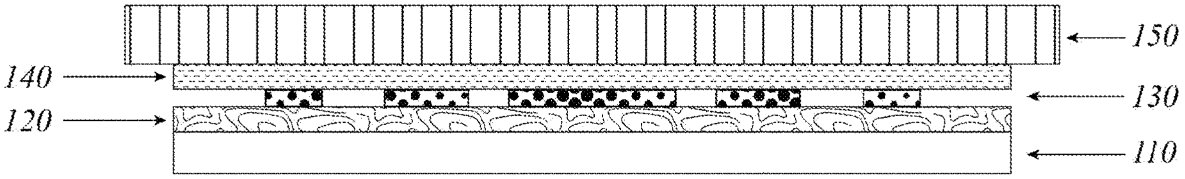
FIG. 4 is a cross-section showing the carrier paper 150 applied over the digitally printed graphic images 130 to yield an uncut transfer.

Next at step 240, the carrier paper or film 150 is applied over the polymeric protective layer 140 and the digitally printed graphic images 130 to yield an uncut transfer, as shown in FIG. 4.

Alternatively, the carrier paper 150 and protective layer 140 may be heat applied to the toner/ink layer 130 simultaneously.

Figure 5:
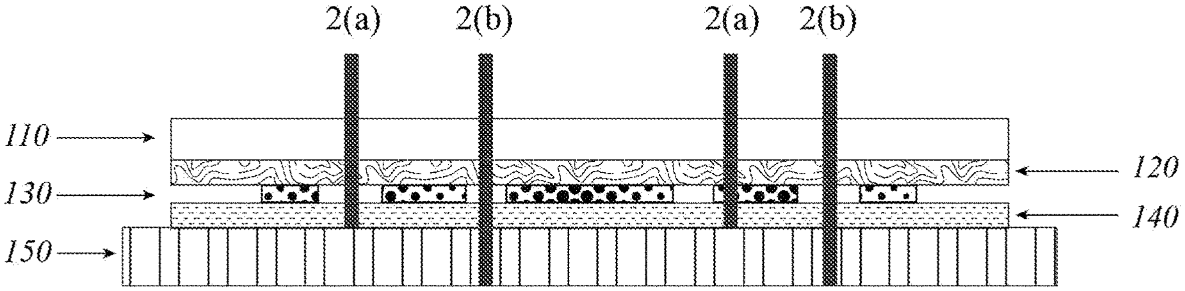
FIG. 5 is a cross-section showing the cut differential of step 250.

Next at step 250 the uncut transfer of Step 240 is cut to one of two levels, level 1 being a kiss cut 2(*a*) and level 2 being a through-cut 2(*b*). Undesired elements of the composite which are separable by virtue of the combination of kiss cuts 2(*a*) and through-cuts 2(*b*) are weeded away. The cut differential of step 250 is illustrated in FIG. 5. Interior unprinted areas that are not desired are through-cut 2(*b*) so they are unattached and simply fall away. On the other hand, complex perimeter shapes are kiss-cut 2(*a*) and weeded out.

Finally, at Step 260 a protective release liner may be added to protect product in transit or in storage (this step does not contribute to the functional aspects of the transfer 100).

Given the completed heat transfer product described above, subsequent application may occur in a separate process where the described product manufactured by the describe method has the protective release sheet removed and the digitally printed heat transfer graphic is applied to a clothing article or apparel, which falls in the category of soft goods such as products made from fabric or other pliable or bendable material. Examples include clothing of any type such as shirts, jerseys, and sweatshirts, as well as other products such as banners, flags, covers, bedding, throws and other soft goods. Transfers can be according to cut singles or roll-to-roll formats. Application equipment suitable for this stage or phase can include heat transfer press machines, for example a Stahl Hotronix® STX16 heat-press or a Geo Knight Swing Away® Press.

Thus, the present invention discloses a digitally primed heat transfer graphic and method of making by digitally printing the heat transfer graphics. This method that simplifies the prior art complex processes by creating a completely digital process which can achieve improved aesthetics and allow for graphical sophistication and resolution of graphical images. The method replaces the conventional multistep process, using a sheet or roll-fed process without compromise to product properties. Specifically, the method for fabricating a heat-transferrable decoration for soft goods made by laser printing or inkjet printing onto an adhesive, laser cutting the adhesive in register with the print and weeding the unprinted adhesive areas or cutting through internal unprinted areas provides the ability to customize each transfer without incurring extra manufacturing steps and costs.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

We claim:

1. A heat transfer product, comprising:

a hot melt adhesive film comprising at least two stratified thermoplastic adhesive layers both composed essentially of thermoplastic hot melt adhesive and including a first adhesive layer that is toner/ink receptive and has a first softening point above 110° C., and a second adhesive layer having a second softening point below 110° C.;

a printed image printed on the first adhesive layer and configured to define one or more graphic images and/or text;

a protective layer comprising a transparent polymeric coating over the printed image;

a carrier paper adhered by a release liner layer to the protective layer.

2. The heat transfer product of claim 1 where the first adhesive layer is dry toner receptive.

3. The heat transfer product of claim 1 where the second softening point facilitates heat sealing to delicate soft goods at lower temperatures.

4. The heat transfer product of claim 1 where the printed image and the first adhesive layer elastically stretch up to at least about 2%.

5. The heat transfer product of claim 4 capable of elongating to 75% in at least one direction without cracking, speckling, or degrading when the graphic is applied to the clothing article or soft good.

6. The heat transfer product of claim 1 where the texture, patterning and or gloss level of the transfer surface can be modified during and after application.

7. The heat transfer product of claim 1 were at least one of the two adhesive layers comprises an opaque filler.

8. The heat transfer product of claim 7 where the filler is Titanium dioxide or carbon black, or a mixture there between.

9. The heat transfer product of claim 1 where the release liner layer from the carrier paper is the only form of protective coating.

10. A heat transfer product, comprising:

a hot melt adhesive film comprising a plurality of stratified hot melt adhesive layers all composed essentially of thermoplastic hot melt adhesive and each having a different softening point;

a printed image printed on one of said adhesive layers and configured to define one or more graphic images and/or text;

a protective layer comprising a transparent polymeric coating coated over the printed image;

a release liner layer; and a carrier paper adhered by said release liner layer to the protective layer.

11. The heat transfer product of claim 10 wherein said hot melt adhesive film comprises at least two adhesive layers including a first adhesive layer that is toner/ink receptive, and a second adhesive layer.

12. The heat transfer product of claim 11 wherein said first adhesive layer has a first softening point above 110° C.

13. The heat transfer product of claim 12 wherein said second adhesive layer has a second softening point below 110° C.

14. The heat transfer product of claim 13 where the second softening point facilitates heat sealing to delicate soft goods at lower temperatures.

15. The heat transfer product of claim 10 where the ink-receptive first adhesive layer is dry toner receptive.

16. The heat transfer product of claim 10 capable of elongating to 75% in at least one direction without cracking, speckling, or degrading when the graphic is applied to the clothing article or soft good.

17. The heat transfer product of claim 10 where at least one of the plurality of adhesive layers comprises an opaque filler.

18. The heat transfer product of claim 17 where the filler is Titanium dioxide or carbon black, or a mixture there between.

* * * * *